United States Patent [19]

Luck

[11] 4,342,114
[45] Jul. 27, 1982

[54] TEA LASER CONFIGURATION

[75] Inventor: Clarence F. Luck, Waltham, Mass.

[73] Assignee: Raytheon Company, Lexington, Mass.

[21] Appl. No.: 118,128

[22] Filed: Feb. 4, 1980

[51] Int. Cl.³ .............................................. H01S 3/09
[52] U.S. Cl. ....................................... 372/87; 372/83; 372/55
[58] Field of Search .................. 331/94.5 PE, 94.5 P, 331/94.5 G, 94.5 C, 94.5 D

[56] References Cited

U.S. PATENT DOCUMENTS 3,852,685 12/1974 Ehrlich et al. ................. 331/94.5 D
3,886,479 5/1975 Pearson .......................... 331/94.5 G

*Primary Examiner*—William L. Sikes
*Assistant Examiner*—Léon Scott, Jr.

*Attorney, Agent, or Firm*—V. D. Pitruzzella; M. D. Bartlett; J. D. Pannone

[57] ABSTRACT

A transverse excitation atmospheric pressure laser employing a preionizing flash board formed on one of the sides of the laser tube. The side wall of the laser tube acts as an insulating support plate having a backing plate on the outside surface and a set of subsidiary electrodes on the inside surface. The subsidiary electrodes are short cylinders bonded to the inside surface of the support plate and having a flanged portion at the opposite end. The preionizing discharge takes place between adjacent subsidiary electrodes in the region between the flanged portions and is thus removed from the support plate. The material for the flanged portions has a high melting point and a low sputtering capability.

A U-shaped enclosure provides a grounded housing for all the high voltage components and also provides a path for the discharge currents.

12 Claims, 6 Drawing Figures

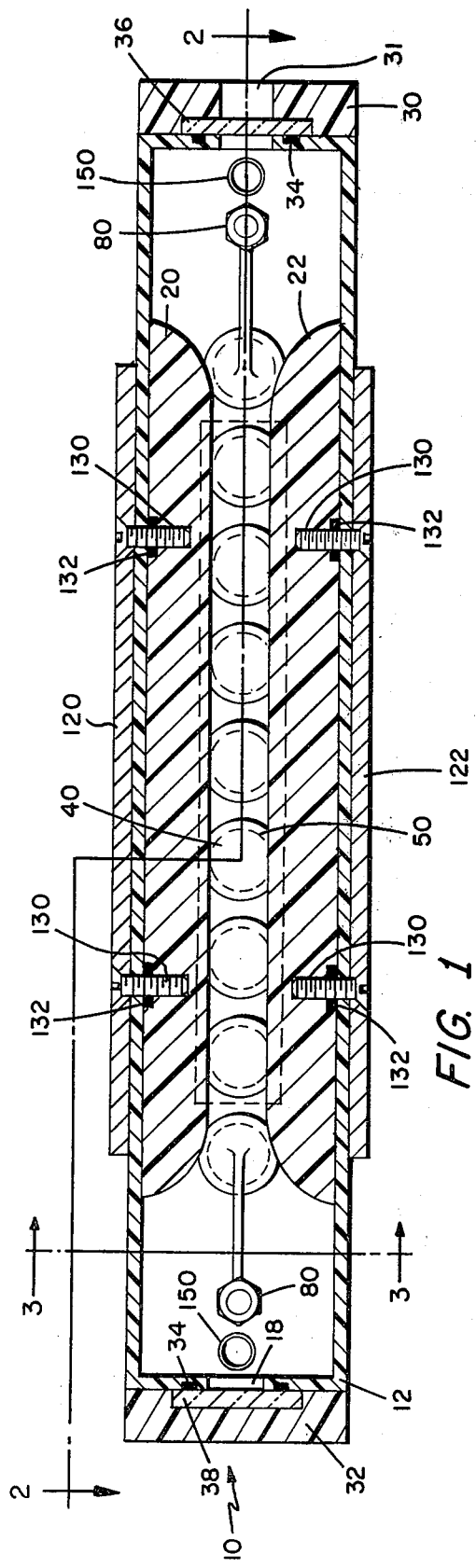
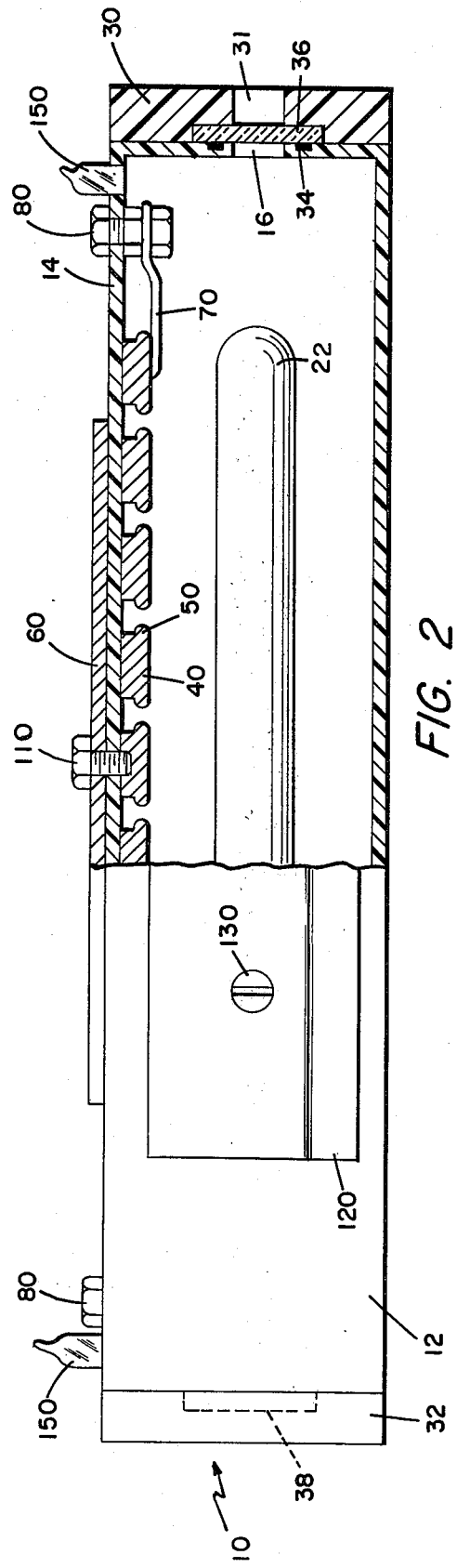
FIG. 1
FIG. 2

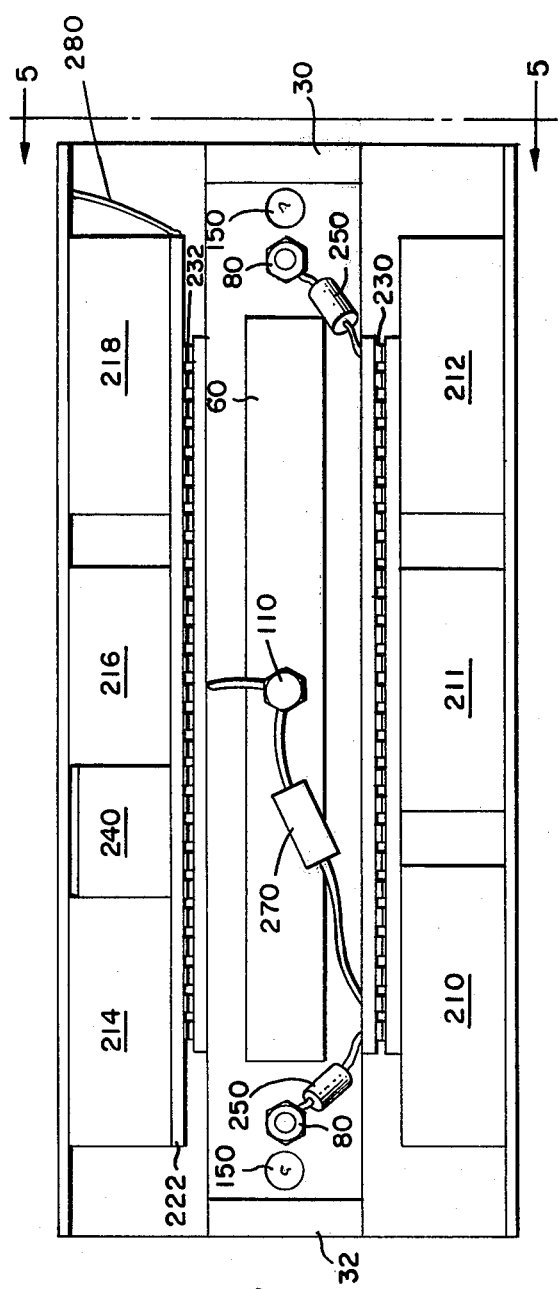
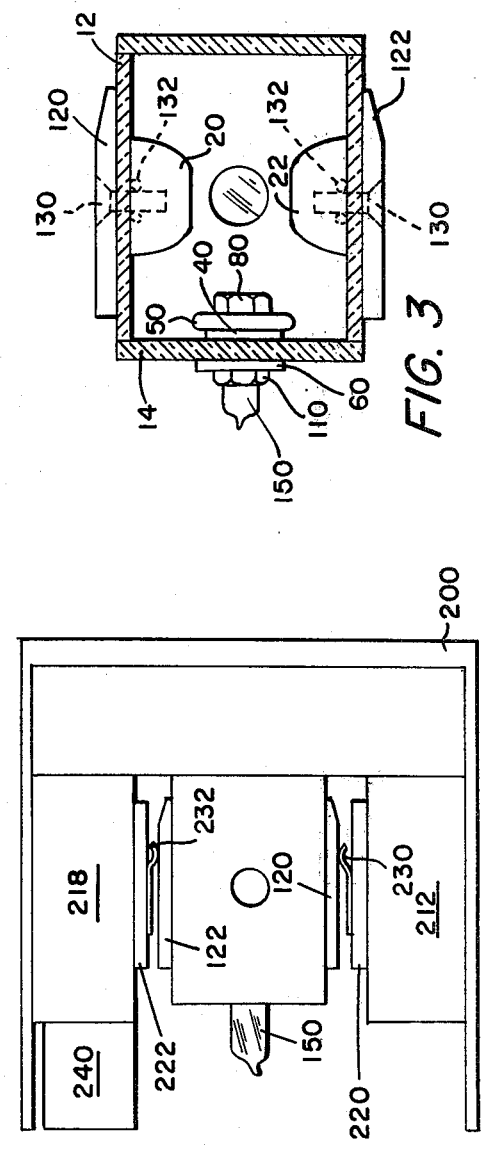

TEA LASER CONFIGURATION

BACKGROUND OF THE INVENTION

A severe problem of TEA lasers is the arcing that can occur during the main discharge between the electrodes. Many schemes have been developed to prevent arcing. They normally avoid concentration of electric field by providing for appropriately shaped main electrodes. They also provide for preionization of laser gas mixture so that a more uniform main discharge can take place throughout the length of the electrodes. One or more wires can be positioned longitudinally and adjacent to the main discharge region such that a subsidiary discharge between the wire and one of the electrodes serves as the preionizing mechanism. A drawback of this scheme is that the wire is a fragile component and can break due to mechanical shock. A multi-electrodes flash-board can be provided such that a subsidiary discharge can take place between the electrodes of the flash-board. A problem that arises in flash board systems is that there is a contamination of the laser tube by chemical compounds created by the reaction of some of the ions of the flash-board electrode material and the ionized gas of laser. The structure of some preionizing electrodes is that of a very thin disk, such as that obtained by a flame spraying technique. A disadvantage that arises is that the energy of the discharge might damage the very thin edges of these electrodes, since they do not have much mass and cannot dissipate the energy effectively. Additionally, the discharge takes place along the surface of the supporting structure further contributing to contamination.

SUMMARY OF THE INVENTION

A flash-board is a structure having a plurality of subsidiary electrodes adjacent the main discharge region in a transverse excitation laser and is used to develop a preionizing discharge to avoid arcing in the subsequent main discharge. This invention discloses a preionizing flash-board that does not contaminate the laser tube with compounds that are a product of chemical reactions taking place as a result of the discharge between electrodes. The laser tube employing the novel electrodes is further slidably mounted within a metallic enclosure acting both as a grounded shield and as a safe housing for all of the high voltage components of the laser system.

The invention may be practiced by providing a transverse excitation pulsed laser having two main electrodes defining a main discharge region and comprising an insulating plate disposed longitudinally adjacent the main discharge region, a plurality of subsidiary electrodes disposed on the insulating plate, each of these electrodes comprising a short metallic supporting element having a flange of a high melting point material remote from the insulating plate and means for producing a discharge between adjacent ones of the flanges prior to the main discharge. Additionally, the laser also comprises a plurality of optical elements for defining a resonant cavity, an elongated envelope for containing laser gases and for supporting the optical elements, the main electrodes and the subsidiary electrodes, with the envelope having a cross-section substantially rectangular in shape. Preferably, the main discharge region has a cross-section substantially square in shape. In a preferred embodiment, the elongated envelope is made of a ceramic material while in another it is made of glass. In the first preferred embodiment, the high melting point flange material is made of tungsten, additionally the supporting element may be made of nickel.

The invention may be further practiced by providing a laser with a plurality of metal bars secured longitudinally on one or more outside surfaces of the elongated laser envelope and means for electrically connecting the metal bars to corresponding ones of main and subsidiary electrodes. Preferably, a U-shaped metal enclosure is provided for containing the elongated envelope and pulse forming means.

Further, the invention provides for a TEA laser system comprising a plurality of subsidiary electrodes disposed longitudinally adjacent to the main discharge region with each of the subsidiary electrodes comprising a short metal supporting element having a flange of high melting point material toward the main discharge region, an elongated envelope, substantially rectangular in cross-section for containing the lasing gas, the two end mirrors, the main and subsidiary electrodes, a plurality of metal bars, disposed longitudinally on opposite exterior surfaces of the envelope in electrical contact with the plurality of subsidiary electrodes and main electrodes, and a metal container, for housing and discharge electronics and the elongated envelope and for providing a shield.

BRIEF DESCRIPTION OF THE DRAWINGS

A better understanding of the features of the preferred embodiment may be obtained from the accompanying detailed description used in conjunction with the drawings in which like reference numbers refer to like parts or items in which:

FIG. 1 is a cross-sectional view of the laser tube of the present invention;

FIG. 2 is a side view taken along cutting line 2 of FIG. 1 of the same laser tube;

FIG. 3 is a side view taken along cutting line 3 of FIG. 1 of the same laser tube;

FIG. 4 is a top view of the laser system of the present invention;

FIG. 5 is a cross-sectional side view taken along cutting line 5 of FIG. 4; and

DESCRIPTION OF THE PREFERRED EMBODIMENT

Figure 6:
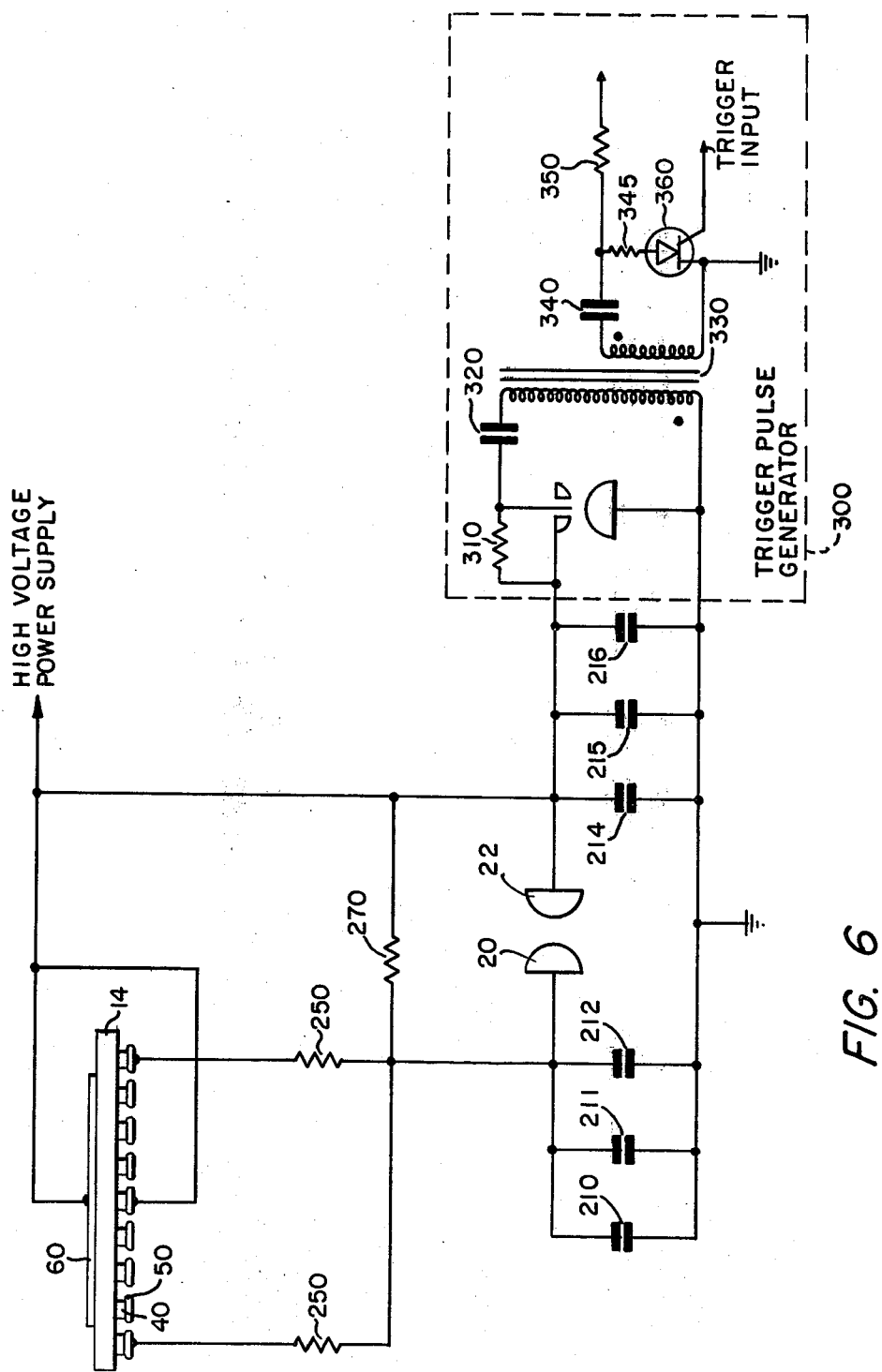
FIG. 6 is a partly schematic diagram showing the circuit components used to generate the preionizing and main discharges.

Referring now to FIGS. 1, 2 and 3, there is shown a rectangular block that forms the laser tube 10. Laser tube 10 must provide an electrically insulating, inert and rugged envelope that is also gas tight. It can be made of a material such as ceramic, since it also withstands temperature cycling. A machinable ceramic material sold by Corning Glass under the trademark of MACOR was used in the embodiment of the invention, but other suitable materials can be used. The laser tube 10 has the main body formed by a trough shaped block 12 and top cover 14. The two end walls of block 12 have circular openings, 16 and 18 respectively, that serve to provide an unobstructed passage for the laser beam. The outside surface of the same two end walls has a groove surrounding openings 16 and 18 respectively, that serve to accommodate an O-ring 34. Mirrors 36 and 38 are positioned over openings 16 and 18 respectively to provide the optical cavity. Mirror 36 is partially transmitting to provide the output beam for the laser. End plates 30 and 32 are positioned over mirrors 36 and 38 respectively by a set of adjusting screws, not shown, that engage the end walls of block 12, and are used to support the two mirrors. They are also used to seal the cavity by pressing the two mirrors 36 and 38 against their respective O-ring 34. The adjusting screws are used to control the alignment of mirrors 36 and 38. End plate 30 is further provided with an opening 31 to permit the output beam to exit from the laser. Two main electrodes 20 and 22 employing a Rogowski configuration are positioned longitudinally within laser tube 10 and are connected to the two opposite side walls of block 12 by screws 130. Electrodes 20 and 22 also have grooves surrounding screws 130 for holding in place O-rings 132 to provide a seal. The two electrodes 20 and 22 define a lasing volume between them that is essentially square in cross-section. This is achieved by making the width of the flat portion of each electrode to be substantially the same as the spacing between the two electrodes. An electrode width of 0.185 inches was used for a high voltage power supply of 12 KVolts. The square discharge region thus obtained leads to a more efficient utilization of the enclosed gas mixture by confining the gas break down, due to the discharge, to the lasing region. Two metal plates 120 and 122 are positioned on the outside of the two side walls of block 12 on the surface adjacent to the two electrodes 20 and 22. Metal plates 120 and 122 are used to provide for electrical and mechanical contact as fully described hereinafter. The top cover 14 of laser tube 10 also forms the insulating support plate of the preionizing flash-board. On the side of support plate 14 facing the main discharge region, there are positioned subsidiary electrodes 40 having a flange 50. On the other side of support plate 14, there is a backing plate 60. These subsidiary electrodes are made of a material that does not break down due to the action of the discharge and that does not react with the ionized laser gases. Materials that have a high melting point and a low sputtering capability are likely candidates. The material actually used is tungsten. These preionizing electrodes are bonded to the support plate 14, with flanges 50 toward the main discharge region. Two flat conductors 70 are used to provide electrical connection between the two end preionizing electrodes and terminals 80. Electrodes 80 can be implemented by using a nut and bolt assembly with appropriate washers. A bolt 110 is used to connect the center preionizing electrode to the backing plate 60. An appropriate lasing mixture of gases comprising carbon dioxide, nitrogen and helium is introduced into laser tube 10 through tubulations 150, which can be sealed off when total mixture pressure is one atmosphere. It has been found that when the preionizing electrodes are made of certain materials they will react with the heavily ionized gases thereby producing contaminating compounds. This is due to the fact that the laser gas mixture breaks down because of the electrical discharge and the preionizing electrodes sputter creating loose metal atoms that combine chemically with the gas ions. For instance, when copper is the metal used for the preionizing electrodes, it was found that the contaminating compound was a yellow green powder. This is, apparently, copper carbonate and copper nitride. Since compounds with helium are not likely, appropriate materials for the preionizing electrodes are those that do not form carbonates, nitrates or nitrides. Additionally, materials having very high melting points and low sputtering capability should be chosen. The material used in the embodiment of FIG. 1 is tungsten. It was found to be desirable to have the discharge occurring between the preionizing electrodes away from the plane of the insulating plate 30. Thus, the configuration for the preionizing electrodes 40 shown in FIGS. 1, 2 and 3 was developed. These subsidiary electrodes 40 can be manufactured as one unit or can be made of two or more parts, the main feature of these electrodes being a support structure 40 having a flange 50 at one of its ends. The surface of disk 40 further away from flange 50 is then bonded to insulating plate 30. For ease of fabrication and low cost, a tungsten wire having a diameter of 0.010 inches and a nickel disk having a thickness of 0.020 inches were used. The wire ring forms the flange 50 and was laser welded to a nickel disk forming the supporting structure 40. Other commonly known methods of manufacturing preionizing electrodes having the required properties can be used.

Referring now to FIGS. 4 and 5, there is shown a complete laser assembly of the present invention. U-shaped metal container 200 encloses laser tube 10 and additional components of the laser system. Capacitors 210, 211 and 212 are positioned on a side wall of metal enclosure 200. This side wall provides an electrical contact for these capacitors since it provides not only mechanical support but also a path to ground since the metallic enclosure 200 is grounded. Metal plate 220 is used to provide additional support for these capacitors and additionally it provides an electrical contact for the other side of the capacitors so that capacitors 210, 211 and 212 are effectively connected in parallel. Similarly, capacitors 214, 216 and 218 are positioned to an opposite side wall of enclosure 200 and the side wall also provides an electrical contact and a path to ground. Metal plate 222 also provides the other electrical contact for these capacitors so that effectively capacitors 214, 216 and 218 are connected in parallel. Connected to metal plate 200 is a thin metal plate 230 having a plurality of resilient metallic spring fingers. These spring loaded resilient fingers are used to contact metal bar 120 on the side of laser tube 10. Similarly, plate 222 has a thin metal plate containing many spring loaded fingers 232 to engage the other metal bar 122 of laser tube 10. Laser tube 10 can then be inserted from the top of enclosure 200 and will establish mechanical and electrical contact via side plates 120 and 122. Side plates 120 and 122 are tapered at one edge to permit easier mating with mechanical fingers 230 and 232. It can then be seen that when laser tube 210 is inserted in enclosure 200, capacitors 210, 211 and 212 are connected in parallel between ground and main electrode 20. Similarly, capacitors 214, 216 and 218 are connected in parallel between ground and main electrode 22. This can also be seen looking at the schematic diagram of FIG. 6. Capacitors 210, 211, 212, 214, 215 and 216 each have a value of 2500 pF, 15 KV, and are cylindrical in shape with their flat surfaces positioned between side walls of enclosure 200 and contact plate 220 and 222 respectively. Another important characteristic of these capacitors is that they have a low inductance in order not to stretch out the discharge pulses. A cylindrical spark gap 240 is positioned in the space between capacitors 214 and 216. The spark gap used is manufactured by EG & G and its part number is GP20B-20. One side of spark gap 240 is in contact with a side wall enclosure 200 forming the ground path. The other side of spark gap 240 is connected to contact plate 222 and is thus connected to main electrode 22. The trigger electrode of spark gap 240 is brought to a terminal on the side of enclosure 200 for connection with a trigger pulse generator. Connected between terminals 80 and contact bar 120 are resistors 250. Resistors 250 serve to limit the current flowing through the preionizing electrodes 40 of the flash-board. A value of 33 ohms for each has been found to be adequate. Terminal 110 is used to connect the center electrode of the flash-board and the backing plane 60 of flash-board to main electrode 22.

A resistor 270 is connected between contact bar 120 and terminal 110. Its purpose, in conjunction with capacitors 214, 215 and 216, is to maintain electrode 22 at the same potential of electrode 20 while capacitors 210, 211 and 212 are charging. Resistor 270 may have a value of 2.2 Kohms, 2 W. A conductor 280 forms a connection between electrodes 8 and a terminal on a side wall of enclosure 200 for eventual connection to a power supply. It can be seen that all the elements of the laser system excluding power supply and the trigger pulse input are part of enclosure 200.

Referring now to FIG. 6, it can be seen that capacitors 210, 211 and 212 are connected between ground and main electrode 20. Capacitors 214, 216 and 218 are connected between ground and main electrode 22. Additionally, the two main electrodes 20 and 22 are connected by resistor 270, insuring that their potential is equalized, and they are connected to a power supply having a voltage of 12 kilovolts. Spark gap 240 is connected between main electrode 20 and ground. Its trigger electrode is brought to a terminal on the side of enclosure 200 for eventual connection to a pulse forming network 300. A resistor 310 is connected between the trigger electrode and its corresponding electrode of spark gap 240 to prevent spurious triggering, its value is 1 Mohms, 2 W. The network 300 provides a pulse of narrow width to trigger both the preionizing discharge and the main discharge.

The required pulse is obtained by pulsing the primary winding of transformer 330 using the circuit formed by capacitor 340, resistor 345, resistor 350, which is connected to a 200 VDC power supply, and SCR 360. Transformer 330 is manufactured by EG & G under part number TR180B. Capacitor 340 has a value of 1.0 microfarad, 400 V. Resistor 345 has a value of 3.9 ohms, 1 W, and resistor 350 has a value of 50 Kohms. SCR 360 is a 2N4102. When a trigger pulse is provided at the gate electrode of SCR 360, SCR 360 is activated and a pulse occurs on the primary winding of transformer 330. This results in a corresponding pulse, having the necessary characteristics, at the secondary winding of transformer 330. This pulse is coupled by capacitor 320, a 500 pF, 15 KV unit, to the trigger electrode of spark gap 240. A circuit of conventional design can be used to provide a signal at the required repetition rate to the trigger input of SCR 360. As a trigger pulse is presented on the trigger terminal of spark gap 240, a spark takes place within the spark gap resulting in main electrode 20 being grounded. This causes the opposite set of capacitors 210, 211 and 212, to supply their full charged voltage across the main electrodes and the flash-board. The flash-board consists of the several subsidiary electrodes 40 and the backing plane 60 separated by a dielectric material 14.

The voltage of capacitors 210, 211 and 212 is applied between the two Rogowski electrodes 20 and 22, and between the two end electrodes of the flash-board and its center electrode. Since these electrodes are separated from backing plate 60 by a dielectric, they act as equivalent capacitors and will start accumulating charges. As the electrical field builds up between these two subsidiary end electrodes and their immediate neighbors, there will be a spark as the electric field exceeds the breakdown of the laser gas. The discharge will cause that neighbor to accumulate charges until the electrical field between it and its immediate neighbor once again exceeds the voltage breakdown for the gas generating a subsequent discharge. This process repeats until a final discharge occurs between the center electrode and its two adjacent neighbors. All the preionizing discharges take place well before the main discharge takes place. This is because the subsidiary electrodes 40 of the flash-board have a shape that lead to a much more rapid build up of the electric field and because backing plate 60 is made not to overlap the two end electrodes, thus leading to a very rapid initial discharge. The discharges between the subsidiary electrodes serve to radiate ultraviolet light which preionizes the gas mixture between the main electrodes so that at the time of the main discharge the discharge will be more uniform and it will preclude localized arcing.

As a descriptive summary for the circuitry of FIG. 6, capacitors 210, 211 and 212, which store the energy delivered to all the electrodes, and capacitors 214, 215 and 216 together with spark gap 240, a heavy current switching device which initiates the pulse, form the pulse forming network for laser tube 10. Transformer 330, SCR 360 and related capacitors and resistors form a trigger circuit whose function is to generate, in response to a low level trigger input pulse, a high voltage spike sufficient to trigger spark gap 240.

One of the advantages of the laser configuration of the present invention, is that by using many resilient fingers for the electrical contact, a better electrical contact is obtained. This occurs because the main discharge occurs in a very short period of time. Under this circumstance, the current flows only through the outside surface of a conductor, this is the well known skin effect. By utilizing a plurality of thin fingers, this configuration is then able to conduct the very large current required by providing a very large surface area as the contact mechanism. Another advantage of the resilient fingers is that the laser tube 10 can be conveniently removed for inspection or repair. Also, all the optical elements are part of the laser tube 10, therefore, this configuration provides for an easier method of aligning the laser beam. An additional advantage of the U-shaped enclosure 200 is that the discharge current passes along the surface of this metallic box. Another result is that when the laser tube 10 is inserted into the metal housing 200, some of the intense radio frequency interference is prevented from radiating, for example, into other sections of an optical radar. Additionally, metal housing 200 is grounded, thus leaving no dangerous high voltage components exposed.

Other modifications to the described embodiments will be apparent to those skilled in the art without departing from the spirit and scope of this invention. Accordingly, it is intended that this invention be not limited except as defined by the appended claims.

What is claimed is:

1. In a transverse excitation pulsed laser having two main electrodes defining a main discharge region and including an elongated envelope containing a gain medium, the improvement comprising:

an insulating plate disposed longitudinally adjacent said main discharge region and having a first surface facing said discharge region;

a plurality of subsidiary electrodes disposed on said insulating plate, each of said subsidiary electrodes comprising a short metallic supporting element having a first end connected to said first surface of said insulating plate and a flange of a high melting point material disposed on a second end of said supporting element; and means for producing a discharge between adjacent ones of said flanges prior to the main discharge.

2. The laser of claim 1 wherein:
said elongated envelope is made of a ceramic material.

3. The laser of claim 2 wherein:
said high melting point flange material is made of tungsten.

4. The laser of claim 3 wherein:
said short supporting element is made of nickel.

5. The laser of claim 1 wherein:
said elongated envelope is made of a glass material.

6. The laser of claim 1 further comprising:
a plurality of metal bars secured longitudinally on one or more outside surfaces of said elongated envelope; and means for electrically connecting said metal bars to corresponding ones of said main and subsidiary electrodes.

7. The laser of claim 1 further comprising:
pulse forming means for producing a main discharge.

8. The laser of claim 7 further comprising:
a metal enclosure substantially U-shaped in cross-section for containing said elongated envelope and said pulse forming means.

9. A TEA laser system comprising:
a gain medium;
means for defining an optical resonant cavity;
a pair of transverse main electrodes;
a plurality of subsidiary electrodes disposed longitudinally adjacent to a main discharge region defined by said main electrodes, each of said subsidiary electrodes comprising a short metal supporting element having a flange of a high melting point material toward the main discharge region;

an elongated envelope substantially rectangular in cross-section containing said gain medium and supporting said cavity defining means, said main electrodes and said subsidiary electrodes;

pulse forming means for producing a main discharge;

means for coupling said pulse forming means to said subsidiary and main electrodes; and a container for housing said pulse forming means and said elongated envelope.

10. The TEA laser system of claim 9 wherein:
said coupling means comprise a plurality of metal bars disposed longitudinally on opposite exterior surfaces of said envelope and resilient contacts disposed on said container for engaging said metal bars, said metal bars being electrically coupled to said plurality of subsidiary electrodes and said main electrodes and said resilient contacts being electrically coupled to said pulse forming means.

11. The TEA laser system of claim 9 wherein:
said housing container is metallic and provides a grounded electrical shield.

12. The TEA laser system of claim 9 wherein:
said gain medium comprises a mixture of carbon dioxide, nitrogen and helium.

* * * * *